United States Patent
Jagtap et al.

(10) Patent No.: US 10,019,481 B2
(45) Date of Patent: Jul. 10, 2018

(54) ADAPTIVE SELECTION OF A DISTRIBUTION METHOD DURING EXECUTION OF PARALLEL JOIN OPERATIONS

(71) Applicant: ORACLE INTERNATIONAL CORPORATION, Redwood Shores, CA (US)

(72) Inventors: Unmesh Jagtap, San Jose, CA (US); Andrew Witkowski, Foster City, CA (US); Mohamed Zait, San Jose, CA (US); Allison Waingold Lee, San Carlos, CA (US); Hari Sankar Sivarama Subramaniyan, Belmont, CA (US); Thierry Cruanes, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1077 days.

(21) Appl. No.: 13/839,399

(22) Filed: Mar. 15, 2013

(65) Prior Publication Data

US 2014/0280023 A1    Sep. 18, 2014

(51) Int. Cl.
    *G06F 17/30*     (2006.01)

(52) U.S. Cl.
    CPC .. *G06F 17/30466* (2013.01); *G06F 17/30498* (2013.01)

(58) Field of Classification Search
    CPC ..................... G06F 17/30463; G06F 17/30445
    See application file for complete search history.

(56) References Cited

U.S. PATENT DOCUMENTS

| | | | |
|---|---|---|---|
| 6,026,394 A * | 2/2000 | Tsuchida | G06F 17/30445 |
| 6,625,593 B1 * | 9/2003 | Leung | G06F 17/30445 |
| 7,020,661 B1 | 3/2006 | Cruanes et al. | |
| 7,278,008 B1 | 10/2007 | Case et al. | |

(Continued)

OTHER PUBLICATIONS

Hasler, "Parallel query distribution methods", http://tonyhasler.wordpress.com/2010/03/10/parallel-query-distribution-methods/ Mar. 10, 2010.*

(Continued)

*Primary Examiner* — Apu Mofiz
*Assistant Examiner* — Farhad Agharahimi
(74) *Attorney, Agent, or Firm* — Vista IP Law Group, LLP

(57) ABSTRACT

A method, system, and computer program product for high-performance database systems. The method commences by estimating, during a compile phase, a statically-calculated system cost of performing parallel join operations over two relations, then selecting, during the compile phase, a first distribution method to perform the parallel join operations. Instructions (e.g., table partitioning) are communicated to two or more execution units for execution of the parallel join operations, and during execution, various measurements are taken pertaining to the performance of a first portion of the parallel join operations using the selected first distribution method. Then, responsive to the measurements a second distribution method is selected and corresponding instructions are communicated to the two or more execution units. The parallel join operations continue, now using the second distribution method.

21 Claims, 7 Drawing Sheets

(56) References Cited

U.S. PATENT DOCUMENTS

| | | | |
|---|---|---|---|
| 2002/0188600 A1 | 12/2002 | Lindsay et al. | |
| 2005/0071331 A1* | 3/2005 | Gao | G06F 17/30471 |
| 2006/0074874 A1* | 4/2006 | Day | G06F 17/30463 |
| 2007/0130110 A1 | 6/2007 | Graefe et al. | |
| 2008/0193103 A1 | 8/2008 | Miyamoto | |
| 2010/0057672 A1* | 3/2010 | Zhou | G06F 17/30498 |
| | | | 707/E17.005 |
| 2012/0036146 A1 | 2/2012 | Annapragada | |
| 2012/0117056 A1 | 5/2012 | Al-Omari et al. | |
| 2013/0311421 A1 | 11/2013 | Erdogan et al. | |

OTHER PUBLICATIONS

Notice of Allowance and Fee(s) due dated Oct. 16, 2015 for related U.S. Appl. No. 13/839,228.
Non-final Office Action dated Dec. 15, 2014 for U.S. Appl. No. 13/839,228.
Yu Xu, et al."Handling Data Skew in Parallel Joins in Shared-Nothing Systems", SIGMOD, Jun. 9-12, 2008, 10 pages.
Nadeem Moidu, "Skewed Join Optimization", Pages, DesignDocs, Jun. 7, 2012, 2 pages.
Hadoop Hive, "Join Syntax", Mar. 10, 2011, 4 pages.
"History, focus, and technology of HP Neoview", Oct. 2, 2008, 11 pages.
HP Press Release, "HP Devlivers Real-time Business Information with Enhanced Neoview Capabilities", Palo Alto, CA, Jun. 2, 2008, 2 pages.
Final Office Action dated Jun. 4, 2015, for U.S. Appl. No. 13/839,228.

* cited by examiner

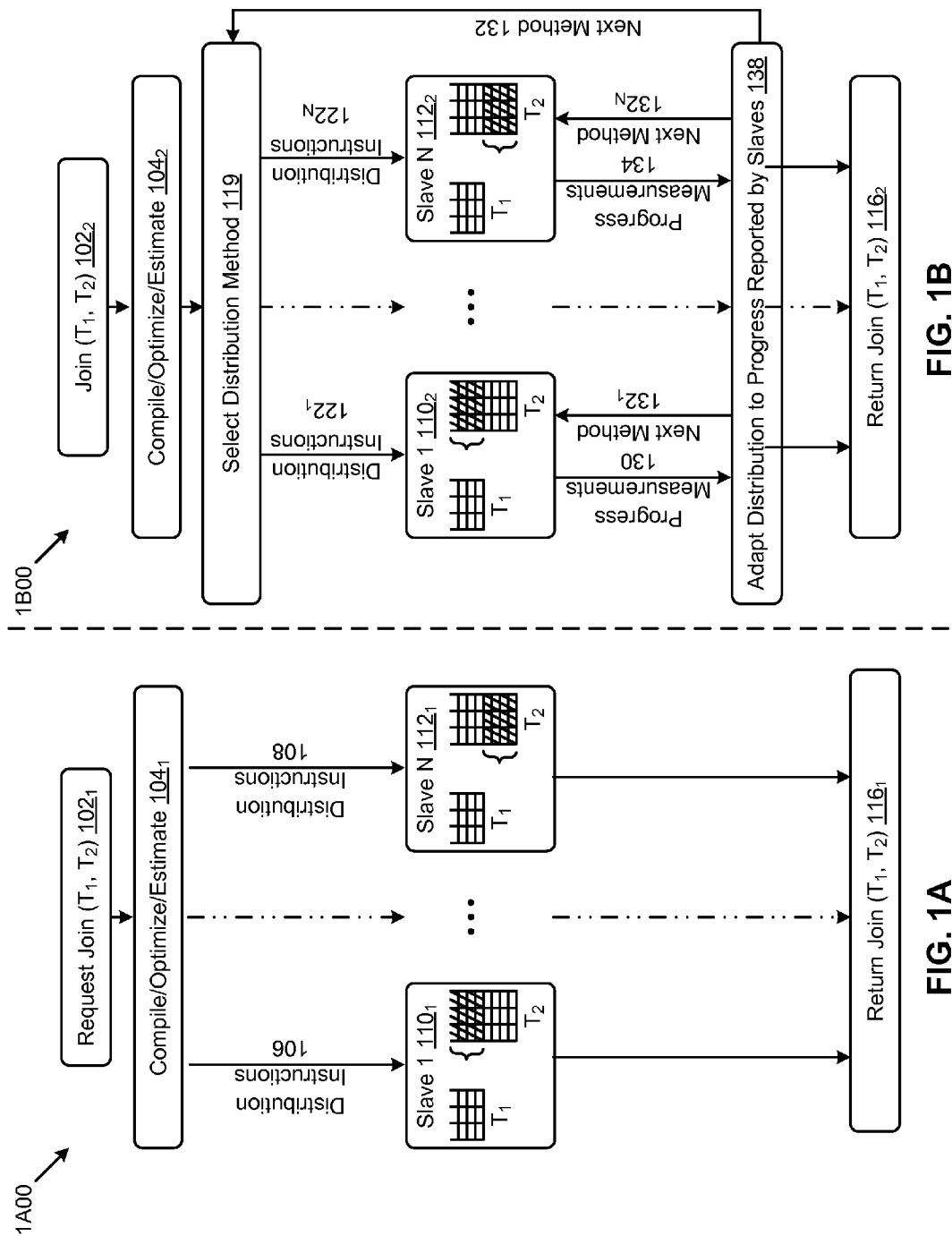

ADAPTIVE SELECTION OF A DISTRIBUTION METHOD DURING EXECUTION OF PARALLEL JOIN OPERATIONS

RELATED APPLICATIONS

The present application is related to co-pending U.S. patent application Ser. No. 13/839,228, entitled "SMALL TABLE REPLICATION FOR PARALLELIZED JOIN OPERATIONS", filed on even date herewith, which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of high-performance database systems and, more particularly, to techniques for adaptive selection of distribution methods based on measurements taken during execution of parallel join operations.

BACKGROUND

Large modern database systems often exploit parallelism in database operations. For example, a join between two tables T1 and T2 might be parallelized by apportioning some portions of the join operations to one execution unit and apportioning a different set of operations to a second (or Nth) execution unit. As an example, a join between two tables T1 and T2 based on some equality predicate (e.g., T1.x1 =T2.x2 ) typically might involve distribution of portions of one or both tables to execution units to perform the join, and, a given execution unit performs comparisons on the join key to find matching rows (e.g., matching based on the equality predicate for a particular dimension).

There are many possible distribution methods for determining how to apportion the tables to a number of parallel execution units. And, the distribution method selected can greatly affect the performance of the parallelized join. In legacy systems, the distribution method is selected a priori during a compile phase (e.g., by a compiler or optimizer) in advance of apportioning the join operations to the execution units. Such a legacy compiler or optimizer tries to estimate the performance of the parallelized join using several distribution methods, and using the estimates, the legacy compiler or optimizer tries to minimize the aggregate cost of performing the parallelized join by selecting the fastest or cheapest or best distribution method. For example, some legacy systems perform estimations that consider the sizes of the tables to be joined, thereby avoiding unnecessary costs of distributing and scheduling.

Unfortunately, in many situations, estimates can differ significantly from actual performance of the parallelized join. Thus, the optimizer might select a distribution method that proves to be ill-selected. In some cases it is possible that the optimizer might select a distribution method that results in a significant workload being performed by only one execution unit, thus leading to poor utilization of execution units, and possibly heavy performance penalties within the system.

Legacy solutions to this problem have focused on improving the estimates so that the best distribution method is picked at compile time. Unfortunately, as earlier indicated, there are many situations in which it is not possible to select the best distribution method until after execution has begun, and legacy system do not implement techniques that are able to switch to a different distribution method once execution of the join commences. Therefore, there is a need for an improved approach.

SUMMARY

The present disclosure provides an improved method, system, and computer program product suited to address the aforementioned issues with legacy approaches. More specifically, the present disclosure provides a detailed description of techniques used in methods, systems, and computer program products for adaptive selection of distribution methods based on measurements taken during execution of parallel join operations.

The improved method and system commences by estimating, during a compile phase, a statically-calculated system cost of performing parallel join operations over two relations, then selecting, during the compile phase, a first distribution method to perform the parallel join operations. Instructions (e.g., table partitioning) are communicated to two or more execution units for execution of the parallel join operations, and during execution, various measurements are taken pertaining to the performance of a first portion of the parallel join operations using the selected first distribution method. Then, based on the measurements a second distribution method is selected and corresponding instructions are communicated to the two or more execution units. The parallel join operations continue, now using the second distribution method.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

FIG. 1A is a data flow diagram of a system for compiler/optimizer selection of distribution methods.

FIG. 1B is a data flow diagram of a system including a module to adapt to measured progress when performing adaptive selection of distribution methods based on measurements taken during execution of parallel join operations, according to some embodiments.

DETAILED DESCRIPTION

Figures 2A, 2B:
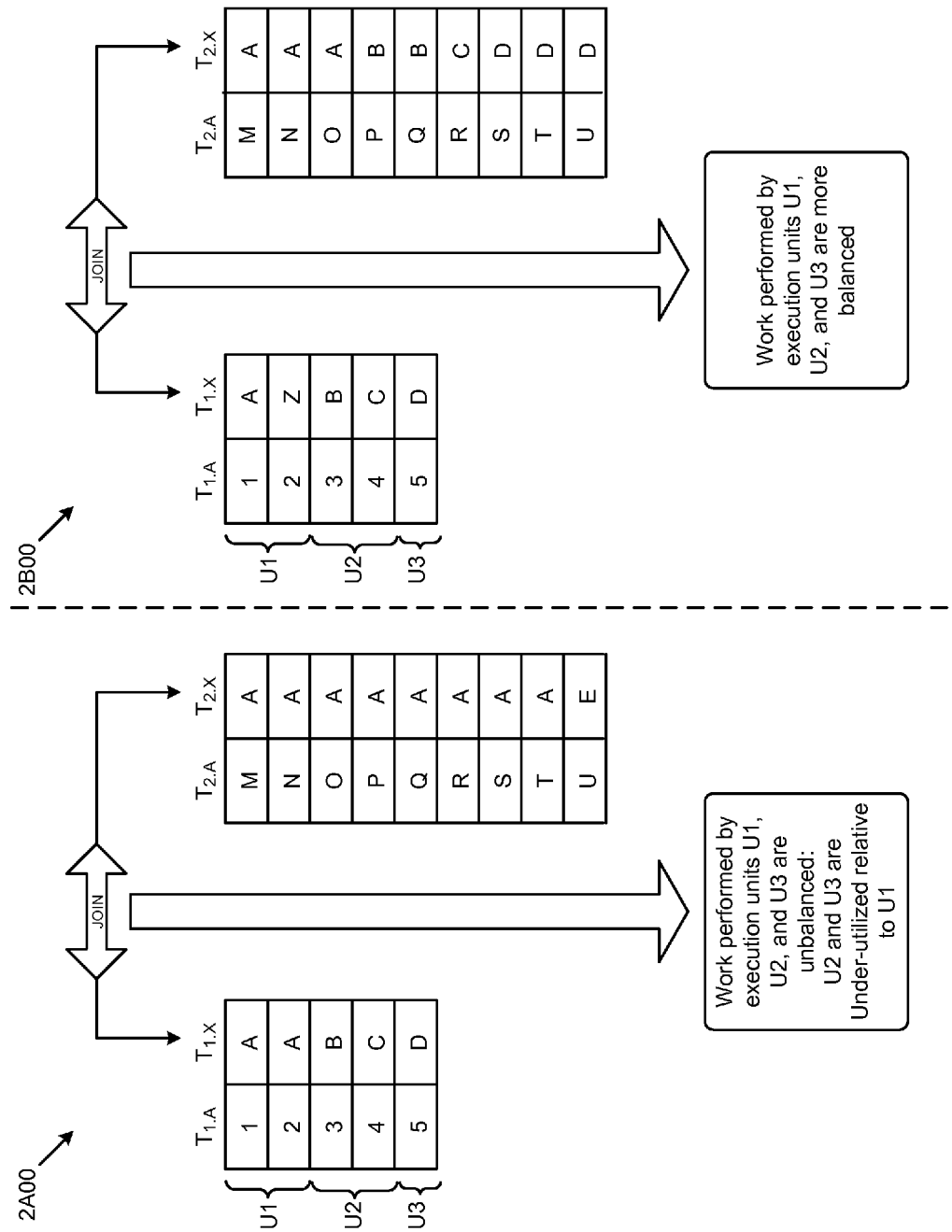
FIG. 2A is a schematic of an example parallelization of a join operation that results in a unbalanced utilization of execution units, according to some embodiments.
FIG. 2B is a schematic of an example parallelization of a join operation that results in an improved utilization of execution units, according to some embodiments.

Some embodiments of the present disclosure are directed to an improved approach for implementing adaptive selection of distribution methods based on measurements taken during execution of parallel join operations. More particularly, disclosed herein and in the accompanying figures are exemplary environments, methods, and systems for implementing adaptive selection of distribution methods based on measurements taken during execution of parallel join operations.

Overview

The herein-disclosed techniques use adaptive join distribution methods for mitigating estimation errors that are common or inherent in pre-execution techniques. As is more fully disclosed in the text and figures below, an initially-selected distribution method (e.g., selected for distributing tables for joins) can be switched during the course of a join execution to use more appropriate distribution methods at execution time. A first distribution method such as a "hash-hash" distribution method can be initially selected, and certain aspects of parallelism in the join are exploited by distributing different portions of the join to multiple parallel server processes (e.g., the execution units shown in FIG. 1A, below). In various embodiments, the commencing of apportioning different portions of the join to multiple parallel server processes occurs after collecting certain statistics. After distributing portions of the relations to be joined (e.g., one side of a join or a portion of one side of a join) to multiple execution units for parallel execution of the join, the aggregate performance (e.g., measured utilization, predicted latency to completion, etc.) as seen across the set of execution units (e.g., the set of execution units that are tasked with producing the left side of the join) can be used to select a second (e.g., more appropriate) distribution method for distributing the inputs of the join (see FIG. 1B, below).

Strictly as an example, in a particular distribution method, only some selected rows of the tables (e.g., T1, T2) are distributed to each execution unit, which each in turn returns a portion of the join result set by performing the join operation on their respective apportionment of the join data. There any many ways to exploit parallelism in the join operation. Strictly as examples, Table 1 shows a sample set of distribution methods:

TABLE 1

Sample Set Of Distribution Methods

| Distribution Method Name | Description |
|---|---|
| Broadcast | Distribute the entire left side table of the join to each execution unit performing the join. The other side of the join is read from the disk. |
| Hash-Hash Distribution | Apportion rows from the tables of the join to each execution unit where each of the apportioned rows contains a particular value that is uniquely identified by a hash function. |
| Broadcast-Round Robin | Distribute all unordered sets of rows of the left side table of the join to each execution unit. The right side of the join is then distributed in a round-robin manner to these execution units. |

Again the examples of Table 1 are strictly examples of distribution methods, and other distribution methods are possible and envisioned.

The selection of a first distribution method might be the 'best' distribution method for the given join, or it might become predictable during execution of the parallel join operations that another distribution method will perform better. For example, if a broadcast-local distribution method were initially selected, then it becomes apparent that the left-side table has a large number of rows to be joined, and then it might be deemed that a hash-hash distribution method should be selected for the remainder of the parallelized join. Other initial selections, measurements, and other second distribution methods should be selected for the remainder of the execution of the parallelized join.

Definitions

Some of the terms used in this description are defined below for easy reference. The presented terms and their respective definitions are not rigidly restricted to these definitions—a term may be further defined by the term's use within this disclosure.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A is a data flow diagram 1A00 of a system for compiler/optimizer selection of distribution methods. As an option, the present data flow diagram 1A00 may be implemented in the context of the architecture and functionality of the embodiments described herein. Also, the data flow diagram 1A00 or any aspect therein may be implemented in any desired environment.

The flow diagram 1A00 exemplified a system that relies solely on the distribution method determined in a compile phase. As shown, the flow commences upon receipt of a request to perform a join operation (operation $102_1$). In this case the join request specifies table $T_1$ to be joined against table $T_2$. Then during a compile phase, an operation to select a distribution method (e.g., based on cardinality estimates) is performed (see operation $104_1$). In this system that relies solely on the distribution method determined in a compile phase, the distribution method is selected a priori (e.g., by a compiler or optimizer or estimator) during a compile phase. In some cases the distribution method is selected a priori (e.g., by a compiler or optimizer or estimator) during a compile phase using a cardinality estimate. A cardinality estimate is an estimate of the number of rows to be produced by part of a query. For instance, during the compile phase of the query in FIG. 1A, it may be estimated that the first input to the join ($T_1$) will return 100 rows, while the second input to the join ($T_2$) will return 1000 rows. A cardinality estimate may be computed for the final result set of a query, or for an intermediate result that is to be further processed. In the example of FIG. 1A, during the compile phase, a cardinality estimate would be computed for the inputs to the join ($T_1$ and $T_2$) as well as the join itself, and any operations to be computed on the results of the join.

As shown, a compiler or optimizer or estimator estimates the characteristics of the parallelized join, and using the estimate, attempts to minimize the aggregate cost of performing the join by selecting one distribution method that is predicted to result in the lowest aggregate cost of performing the join. Once selected, then some number of execution units are allocated (e.g., see slave 1 $110_1$, slave N $112_1$, etc.) and instructions are sent to the execution units. The instructions serve to assign and distribute portions of the join to one or another of the allocated execution units (see distribution instructions 106 and distribution instructions 108). The execution units operate on their assigned portions of the join and each execution unit returns their individual results of their portion of the join (see operation to return join $116_1$).

As earlier mentioned, the optimizer decision to choose a particular distribution method is driven by estimates or default values obtained or calculated before execution of the join commences. Unfortunately, in many situations, it is not possible or not practical to calculate a high confidence estimate. Strictly as one example, a compiler/optimizer might not be able to predict performance accurately when the result set forming inputs of a join are themselves outputs of a complex operation such as multiple joins or a view. Thus, the optimizer might over-estimate or under-estimate, and based on the under- or over-estimates then determine a distribution method. During the course of execution, and as described above, the a priori determined distribution method can prove to be ill-selected.

For understanding aspects of the improvements disclosed herein, the system of FIG. 1A can be compared with the system of FIG. 1B. In particular, FIG. 1B includes a module to measure progress of the join operations and to adapt by swapping out the first distribution model for a second distribution model based on measurements taken during execution of distributed join operations.

FIG. 1B is a data flow diagram 1B00 of a system including a module to adapt to measured progress when performing adaptive selection of distribution methods based on measurements taken during execution of parallel join operations. As an option, the present data flow diagram 1B00 may be implemented in the context of the architecture and functionality of the embodiments described herein. Also, the data flow diagram 1B00 or any aspect therein may be implemented in any desired environment.

As shown, the system of FIG. 1B commences upon receipt of a request to perform a join operation (operation $102_2$). Then during a compile phase, an operation to select a distribution method based on estimates is performed (see operation $104_2$). As shown, a first distribution method is selected a priori (e.g., by a compiler or optimizer) during a compile phase, and some number of execution units are allocated (e.g., see slave 1, $110_2$, slave N $112_2$, etc.) and instructions pertaining to the apportioning of the join using the first distribution method are communicated to the allocated execution units (see distribution instructions $122_1$ and distribution instructions $122_N$).

The execution units operate on their assigned portions of the join and communicate measurements (e.g., performance measurements, partial results, cardinality of the assigned join, etc.) to a module that serves to adapt on the basis of the measured results (e.g., see module 138). Such a module can receive progress reports (e.g., see progress measurements 130, progress measurements 134) and make a determination as to if and when to switch to a different distribution method. For example, a module to adapt a distribution method to reported progress measurements (see module 138) might be used to select a second distribution method, and to communicate aspects of that distribution method (e.g., distribution method name) to one or more of the execution units (e.g., see slave 1 $110_2$ and, slave N $112_2$, etc.), which in turn switch to the designated next distribution method (see next method path $132_1$, see next method path $132_N$). As an alternative, a module to adapt a distribution method to reported progress measurements (see module 138) might communicate (e.g., using path 132) aspects of the reported progress measurements of the second distribution method to a selector (see module 119), which selector in turn might communicate distribution instructions to the execution units which in turn process the parallelized join operations in accordance with their respective received distribution instructions.

Figure 3:
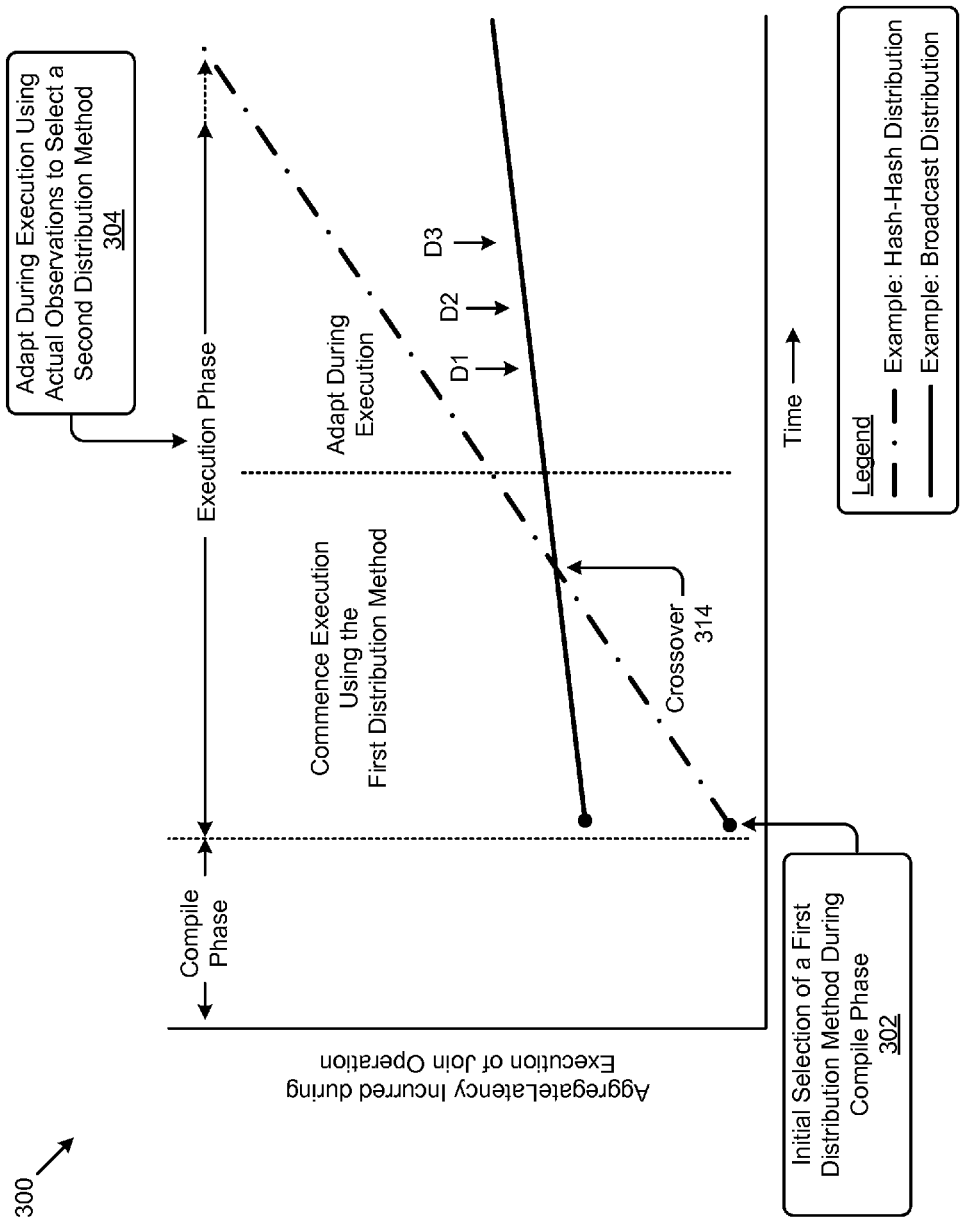
FIG. 3 is a chart showing operations being performed in phases as occurs in systems for performing adaptive selection of distribution methods based on measurements taken during execution of parallel join operations, according to some embodiments.

In exemplary situations, the switch to the designated second distribution method is intended to decrease the aggregate cost of performing the join, however it is possible that yet another switch is performed to another distribution method before the join operation is completed (see FIG. 3).

Irrespective of the switch or switches, at some moment in time, individual join results from the execution units can be communicated to the requestor (see operation to return join $116_2$).

As can now be understood, the distribution method used can be adapted based on actual measurements taken during the execution of the join. Such an adaptation can occur if the performance of the initially-selected distribution method is predicted to be slower than an alternative (e.g., adapted) distribution method. There can be many reasons why performance of the initially-selected distribution method can be determined or predicted to be slower than the alternative distribution method. For example, a first distribution method might result in poor utilization of the slaves. Some examples are discussed in FIG. 2A and FIG. 2B.

FIG. 2A is a schematic 2A00 of an example parallelization of a join operation that results in an unbalanced utilization of execution units. In the example shown, the actual work performed to accomplish the join is performed solely by unit U1. More specifically, even though the join workload is apportioned via 2 rows of table T1 to each of units U1, U2, and U3, the workload that is accomplished by unit U1 amounts to 16 rows joined by U1, whereas U2 and U3 do not perform any join operations since there is no match between $T_{1,x}$ and $T_{2,x}$. The foregoing is merely one example (i.e., the example of skew), and many other reasons might result in unbalanced utilization of execution units.

FIG. 2B is a schematic 2B00 of an example parallelization of a join operation that results in an improved utilization of execution units. In the example shown, the actual work performed to accomplish the join is balanced across unit "U1", unit "U2", and unit "U3".

FIG. 3 is a chart 300 showing operations being performed in phases as occurs in systems for performing adaptive selection of distribution methods based on measurements taken during execution of parallel join operations. As an option, the present chart 300 may be implemented in the context of the architecture and functionality of the embodiments described herein. Also, the chart 300 or any aspect therein may be implemented in any desired environment.

In some situations, and again referring to the tables depicted in FIG. 2A and FIG. 2B, a given pair of tables might be estimated (e.g., using pre-computed statistics) such that an initially selected distribution method is selected— only to find out during execution that the initially selected distribution method is performing poorly. For example, estimates based on statistics may be wrong since pre-computed statistics may quickly become out-of-date and sometimes significantly inaccurate because of data modifications that have taken place since they were computed. Or, as earlier indicated, the tables $T_1$ and $T_2$ might themselves be the results of database operations, and might not be available to be confidently estimated (e.g., using pre-computed statistics) at compile time.

For this and other reasons, a compile-time calculation or estimate might be substantially wrong, or might be expensive to calculate, or might be impossible to calculate without actually executing operations constituent to the subject join operations. It can also be hard to compute cardinality for tables with complex predicates.

As shown, an initial selection of a first distribution during a compile phase using an estimate based on cardinality (see operation 302) might select a hash-hash distribution method. The selected hash-hash distribution method appears, at least through the compile phase, to be the lowest-cost option (as shown), and indeed significantly lower cost that the shown alternative broadcast distribution method.

However, and as depicted, after entering the execution phase, it might be that the compile phase estimate was significantly wrong. During execution, a component of the system (e.g., a module to adapt a distribution method to progress such as module 138) might be used to collect measurements during the execution phase, and to use such measurements to select a second distribution method (see operation 304). As discussed herein, the determination of when to select a second distribution method can be made at various points in time during the execution phase, and can be made on the basis of various thresholds. For example, the determination to select a second distribution method can be made at point D1 during the execution phase, and using a respective threshold (e.g., threshold of point D1). Or, for example, the determination to select a second distribution method can be made at point D2 during the execution phase, and using a respective threshold (e.g., threshold of point D2). Or, for another example, the determination to select a third distribution method can be made at point D3 during the execution phase, and using a respective threshold (e.g., threshold of point D3). A threshold can be a value used as a difference between the predicted system cost of continuing with the first distribution method and the predicted system cost of switching to a second distribution method.

The determination to select an alternate distribution method can be made at any point during the execution phase, specifically, after reaching the crossover point 314, at a time co-occurring with the crossover point 314, or even at any point during the execution phase before reaching the crossover point 314.

Figure 4:
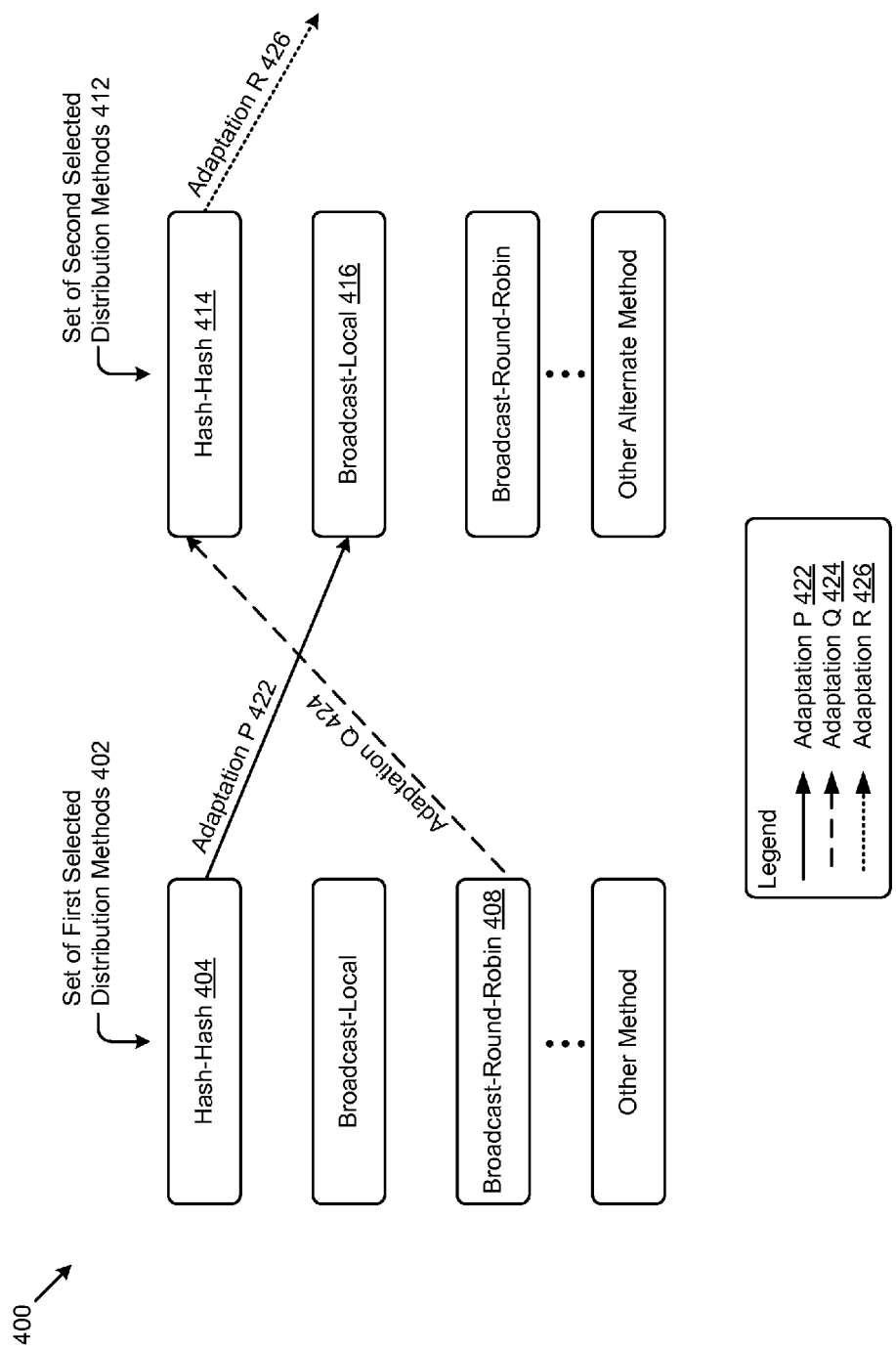
FIG. 4 depicts an adaptive selection scheme used in systems for performing adaptive selection of distribution methods based on measurements taken during execution of parallel join operations, according to some embodiments.

FIG. 4 depicts an adaptive selection scheme 400 used in systems for performing adaptive selection of distribution methods based on measurements taken during execution of parallel join operations. As an option, the present adaptive selection scheme 400 may be implemented in the context of the architecture and functionality of the embodiments described herein. Also, the adaptive selection scheme 400 or any aspect therein may be implemented in any desired environment.

As shown, the adaptive selection scheme 400 includes a first set of distribution methods 402 from which a first selected distribution method is determined during a compile phase. As earlier discussed, a second distribution method (e.g., a second distribution method different from the first distribution method) can be determined during an execution phase. The second set of distribution methods 412 from which a second selected distribution method is determined during an execution phase can comprise any or all (or none) of the methods from the first set of distribution methods 402. In the embodiment shown, a system for adaptive selection of distribution methods based on measurements taken during execution of parallel join operations can switch from a hash-hash distribution method 404 to a broadcast-local distribution method 416 using adaptation P 422. Or in another situation, a system for adaptive selection of distribution methods based on measurements taken during execution of parallel join operations can switch from a broadcast-round-robin distribution method 408 to a hash-hash distribution method 414 using adaptation Q 424. It is possible for one or more further adaptations to be implemented by switching from a second selected distribution method to a third selected distribution method during an execution phase (e.g., using adaptation R 426).

Example

In exemplary broadcast cases, the smaller of the tables (for example $T_1$) is broadcasted to all the execution unit processes. The larger table (for example $T_2$) is then either accessed locally by the execution unit processes, or distributed randomly to the parallel execution units. In this exemplary broadcast case, each parallel execution unit receives an entire copy of $T_1$ and a portion of $T_2$.

Additional Embodiments of the Disclosure

Figure 5:
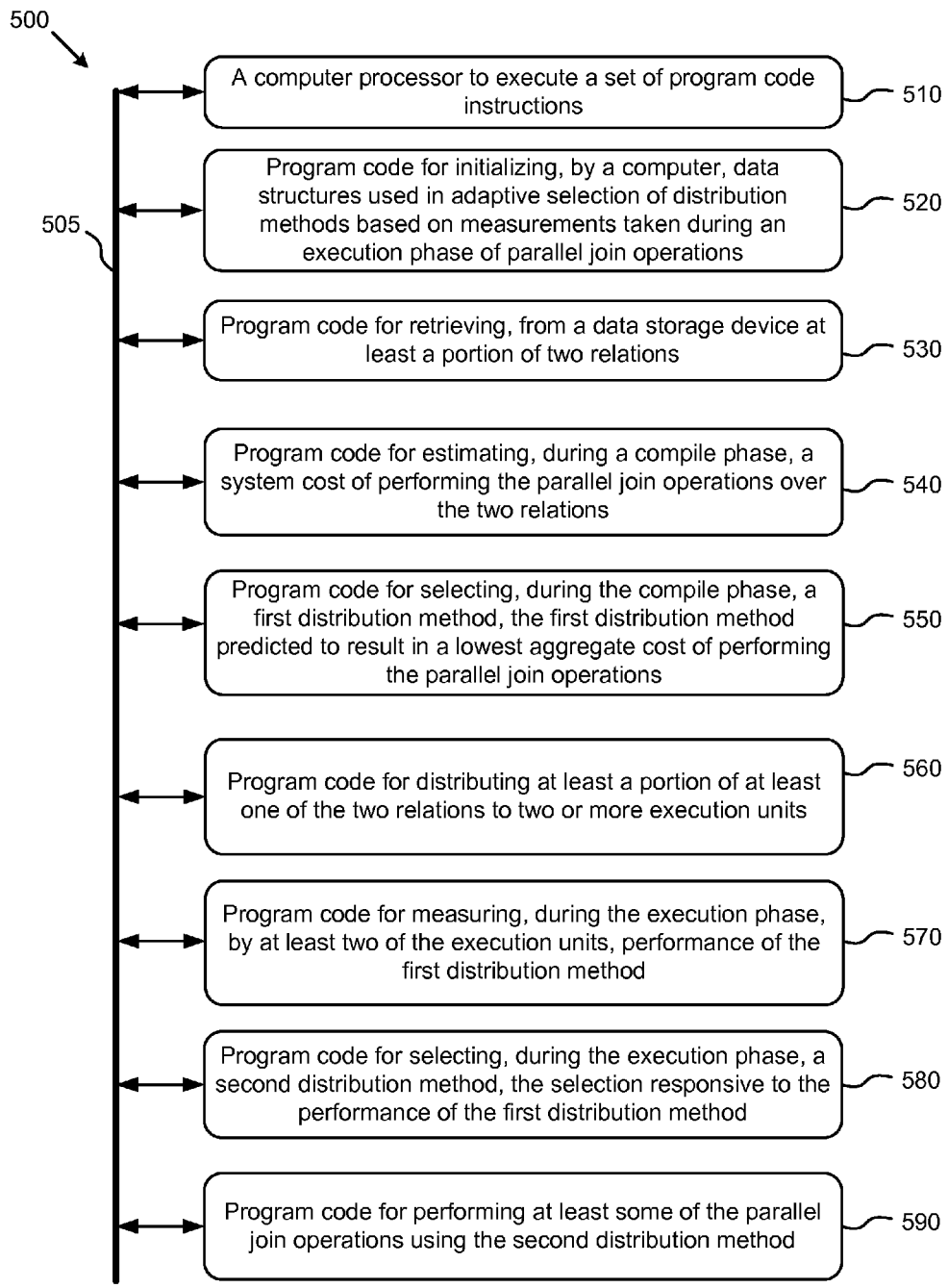
FIG. 5 is a flow chart of a system for adaptive selection of distribution methods based on measurements taken during execution of parallel join operations, according to some embodiments.

FIG. 5 is a flow chart of a system for adaptive selection of distribution methods based on measurements taken during execution of parallel join operations. As an option, the present system 500 may be implemented in the context of the architecture and functionality of the embodiments described herein. Of course, however, the system 500 or any operation therein may be carried out in any desired environment.

As shown, system 500 comprises at least one processor and at least one memory, the memory serving to store program instructions corresponding to the operations of the system. An operation can be implemented in whole or in part using program instructions accessible by a module. The modules are connected to a communication path 505, and any operation can communicate with other operations over communication path 505. The modules of the system can, individually or in combination, perform method operations within system 500. Any operations performed within system 500 may be performed in any order unless as may be specified in the claims. The embodiment of FIG. 5 implements a portion of a computer system, shown as system 500, comprising a computer processor to execute a set of program code instructions (see module 510) and modules for accessing memory to hold program code instructions to perform: initializing, by a computer, data structures used in adaptive selection of distribution methods based on measurements taken during an execution phase of parallel join operations (see module 520); retrieving, from a data storage device at least a portion of two relations (see module 530); estimating, during a compile phase, a system cost of performing the parallel join operations over the two relations (see module 540); selecting, during the compile phase, a first distribution method, the first distribution method predicted to result in a lowest aggregate cost of performing the parallel join operations (see module 550); distributing at least a portion of at least one of the two relations to two or more execution units (see module 560); measuring, during the execution phase, by at least two of the execution units, performance of the first distribution method (see module 570); selecting, during the execution phase, a second distribution method, the selection responsive to the performance of the first distribution method (see module 580); and performing at least some of the parallel join operations using the second distribution method (see module 590).

In some situations, when estimating during a compile phase, a system cost of performing the parallel join operations over the two relations and for distributing at least a portion of at least one of the two relations to two or more execution units, the system estimates the number of rows to be buffered from a left input (e.g., table $T_1$) of the join. Then, a decision about the distribution method is taken based on measurements collected on the rows seen in the buffer at execution time.

In some situations, when the compiler/optimizer overestimates the result set size and picks (for example) a hash-hash distribution method, each execution unit will buffer a calculated number of rows coming from the left input of the join at execution time. If the number of rows seen at the left side of the join is less than the calculated number, then the distribution method will be switched to broadcast-round-robin, otherwise the former distribution method of hash-hash will be retained.

Figure 6:
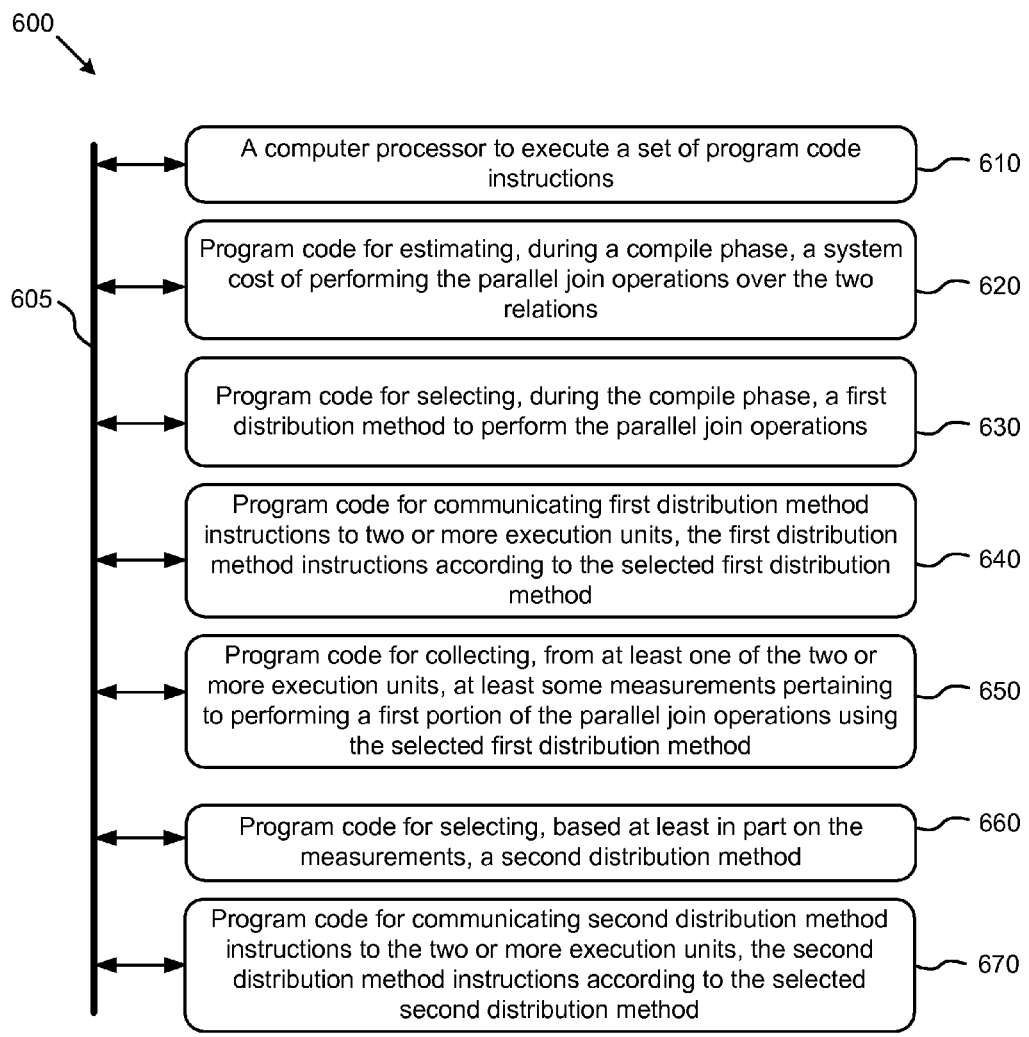
FIG. 6 exemplifies a flow chart system for adaptive selection of distribution methods based on measurements taken during execution of parallel join operations, according to some embodiments.

FIG. 6 exemplifies a flow chart system for adaptive selection of distribution methods based on measurements taken during execution of parallel join operations. As an option, the present system 600 may be implemented in the context of the architecture and functionality of the embodiments described herein. Of course, however, the system 600 or any operation therein may be carried out in any desired environment.

As shown, system 600 comprises at least one processor and at least one memory, the memory serving to store program instructions corresponding to the operations of the system. As shown, an operation can be implemented in whole or in part using program instructions accessible by a module. The modules are connected to a communication path 605, and any operation can communicate with other operations over communication path 605. The modules of the system can, individually or in combination, perform method operations within system 600. Any operations performed within system 600 may be performed in any order unless as may be specified in the claims. The embodiment of FIG. 6 implements a portion of a computer system, shown as system 600, comprising a computer processor to execute a set of program code instructions (see module 610) and modules for accessing memory to hold program code instructions to perform: estimating, during a compile phase, a system cost of performing the parallel join operations over the two relations (see module 620); selecting, during the compile phase, a first distribution method to perform the parallel join operations (see module 630); communicating first distribution method instructions to two or more execution units, the first distribution method instructions according to the selected first distribution method (see module 640); collecting, from at least one of the two or more execution units, at least some measurements pertaining to performing a first portion of the parallel join operations using the selected first distribution method (see module 650); selecting, based at least in part on the measurements, a second distribution method (see module 660); and communicating second distribution method instructions to the two or more execution units, the second distribution method instructions according to the selected second distribution method (see module 670).

System Architecture Overview

Figure 7:
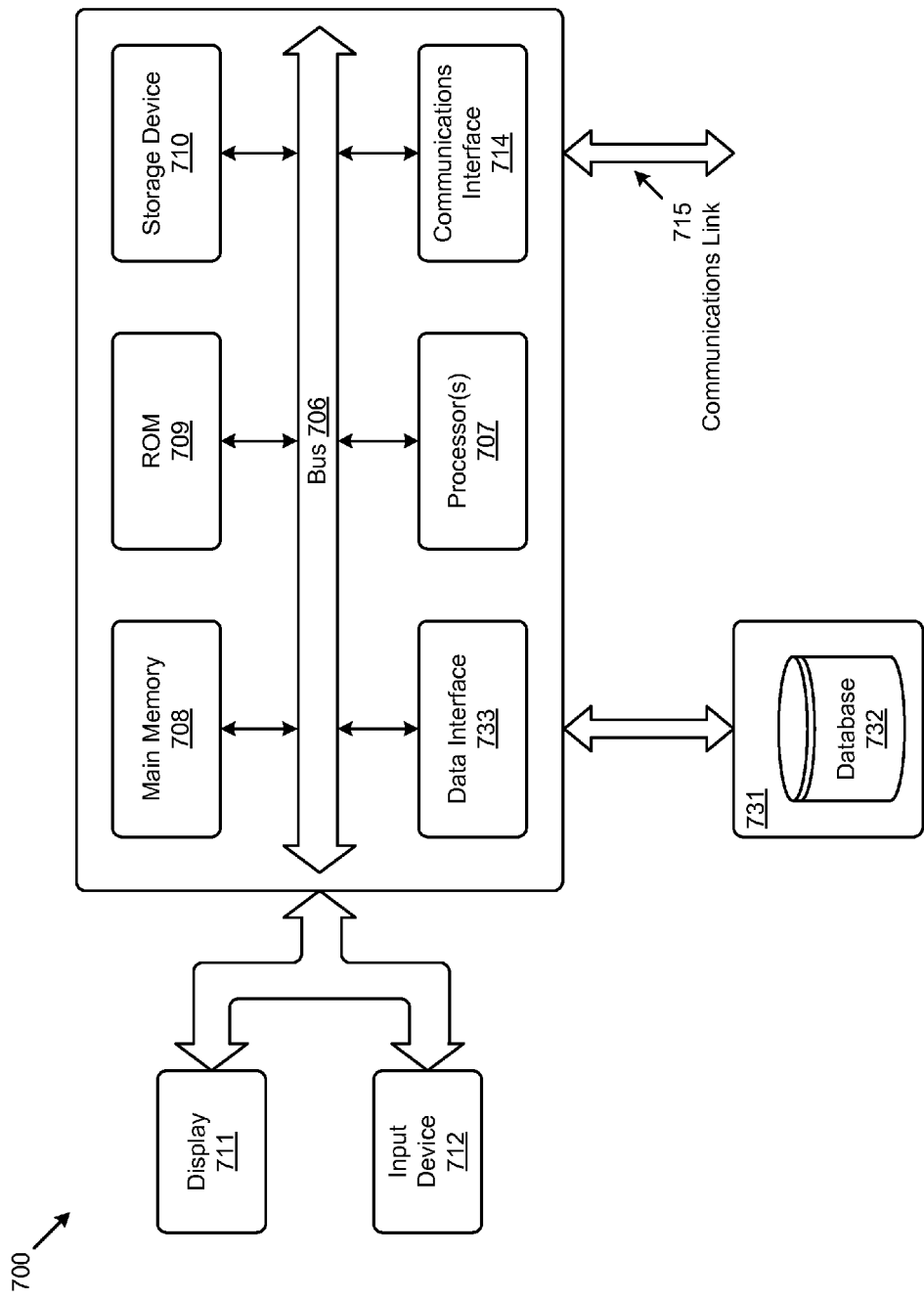
FIG. 7 depicts a block diagram of an instance of a computer system suitable for implementing an embodiment of the present disclosure.

FIG. 7 depicts a block diagram of an instance of a computer system 700 suitable for implementing an embodiment of the present disclosure. Computer system 700 includes a bus 706 or other communication mechanism for communicating information, which interconnects subsystems and devices, such as a processor 707, a system memory 708 (e.g., RAM), a static storage device (e.g., ROM 709), a disk drive 710 (e.g., magnetic or optical), a data interface 733, a communication interface 714 (e.g., modem or Ethernet card), a display 711 (e.g., CRT or LCD), input devices 712 (e.g., keyboard, cursor control), and an external data repository 731.

According to one embodiment of the disclosure, computer system 700 performs specific operations by processor 707 executing one or more sequences of one or more instructions contained in system memory 708. Such instructions may be read into system memory 708 from another computer readable/usable medium, such as a static storage device or a disk drive 710. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 707 for execution. Such a medium may take many forms, including but not limited to, non-volatile media and volatile media. Non-volatile media includes, for example, optical or magnetic disks, such as disk drive 710. Volatile media includes dynamic memory, such as system memory 708.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 700. According to certain embodiments of the disclosure, two or more computer systems 700 coupled by a communications link 715 (e.g., LAN, PTSN, or wireless network) may perform the sequence of instructions required to practice the disclosure in coordination with one another.

Computer system 700 may transmit and receive messages, data, and instructions, including programs (e.g., application code), through communications link 715 and communication interface 714. Received program code may be executed by processor 707 as it is received, and/or stored in disk drive 710 or other non-volatile storage for later execution. Computer system 700 may communicate through a data interface 733 to a database 732 on an external data repository 731. A module as used herein can be implemented using any mix of any portions of the system memory 708, and any extent of hard-wired circuitry including hard-wired circuitry embodied as a processor 707.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method for adaptive selection of distribution methods responsive to measurements taken during execution of parallel join operations over two relations, the method comprising:

estimating, during a compile phase, a system cost of performing parallel join operations over two relations;

selecting, during the compile phase, a first distribution method to perform the parallel join operations;

communicating first distribution method instructions to two or more execution units;

collecting, from at least one of the two or more execution units during execution of the parallel join operations, at least some measurements pertaining to performing a first portion of the parallel join operations, the first portion of the parallel join operations corresponding to the first distribution method that apportions the two relations among at least some of the two or more execution units;

predicting, during the execution of the parallel join operations using the first distribution method, a first system cost of performing the parallel join operations with a second distribution method and a second system cost of continuing with the first distribution method based in part or in whole upon the at least some measurements;

selecting the second distribution method based at least in part on the at least some measurements pertaining to performing the first portion of the parallel join operations, the second distribution method apportions the parallel join operations differently than the first distribution method, the first distribution method and the second distribution method comprising different distribution methods, the first distribution method and the second distribution method comprising at least two of a broadcast-local distribution method, hash-hash distribution method, or broadcast-round-robin distribution method, wherein the second distribution method is selected after the parallel join operations commence and is predicted to result in a lower aggregate cost of performing the parallel join operations as compared with continuing with the first distribution method; and continuing the execution of the parallel join operations at least by communicating second distribution method instructions to at least some of the two or more execution units, and by apportioning at least some of the two relations among at least some of the two or more execution units according to the second distribution method.

2. The method of claim 1, wherein the two or more execution units are allocated for performing the parallel join operations from a plurality of execution units, and wherein the first distribution method instructions assign and distribute portions of the parallel join operations to the two or more execution units allocated for performing the parallel join operations from a plurality of execution units, the execution units operate on individual portions of the parallel join operations and return individual results of their portion of the parallel join operations.

3. The method of claim 1, wherein estimating the system cost comprises evaluating at least one of, a cardinality, a number of distinct values, a skew.

4. The method of claim 1, wherein collecting the at least some measurements pertaining to performing the first portion of the parallel join operations comprises a row count of at least one of the relations.

5. The method of claim 1, wherein the selection of the second distribution method further comprises selection of when to switch to the second distribution method, and wherein the selection of the second distribution method is based on at least meeting a threshold difference between the first system cost of switching to the second distribution method and the second system cost of continuing with the first distribution method.

6. The method of claim 1, further comprising: selecting a third distribution method.

7. The method of claim 1, further comprising:

selecting a third distribution method, and predicting, during the execution of the parallel join operations using the second distribution method, a third system cost of performing the parallel join operations with the third distribution method and a fourth system cost of continuing with the second distribution method based in part or in whole upon the at least some measurements, and wherein estimating the system cost comprises evaluating at least one of, a cardinality, a number of distinct values, a skew, and the cardinality is an estimate of a number of rows to be produced by part of a query, wherein the two or more execution units are allocated for performing the parallel join operations from a plurality of execution units, and wherein the first distribution method instructions assign and distribute portions of the parallel join operations to the two or more execution units allocated for performing the parallel join operations from a plurality of execution units, the execution units operate on individual portions of the parallel join operations and return individual results of their portion of the parallel join operations, wherein the selection of the second distribution method further comprises selection of when to switch to the second distribution method, and wherein the selection of the second distribution method is based on at least meeting a threshold difference between the first system cost of switching to the second distribution method and the second system cost of continuing with the first distribution method, wherein the broadcast-local distribution method comprises distributing an entire first table of the parallel join operations over a first relation of the two relations to each execution unit performing the parallel join operations and wherein a second relation of the two relations are read from a nonvolatile storage device,
wherein the hash-hash distribution method comprises apportioning rows from the two relations of the parallel join operations to the two or more execution units where each apportioned row contains a particular value that is uniquely identified by a hash function, and
wherein the broadcast-round-robin distribution method comprises distributing unordered sets of rows of the two relations to the two or more execution units.

8. A computer system for adaptive selection of distribution methods responsive to measurements taken during execution of parallel join operations over two relations, comprising:
a computer processor to execute a set of program code instructions; and
a memory to hold the set of program code instructions, in which the set of program code instructions comprises program code to perform:
estimating, during a compile phase, a system cost of performing parallel join operations over two relations;
selecting, during the compile phase, a first distribution method to perform the parallel join operations;
communicating first distribution method instructions to two or more execution units;
collecting, from at least one of the two or more execution units during execution of the parallel join operations, at least some measurements pertaining to performing a first portion of the parallel join operations, the first portion of the parallel join operations corresponding to the first distribution method that apportions the two relations among at least some of the two or more execution units;
predicting, during the execution of the parallel join operations using the first distribution method, a first system cost of performing the parallel join operations with a second distribution method and a second system cost of continuing with the first distribution method based in part or in whole upon the at least some measurements;
selecting the second distribution method based at least in part on the at least some measurements pertaining to performing the first portion of the parallel join operations, the second distribution method apportions the parallel join operations differently than the first distribution method, the first distribution method and the second distribution method comprising different distribution methods, the first distribution method and the second distribution method comprising at least two of a broadcast-local distribution method, hash-hash distribution method, or broadcast-round-robin distribution method, wherein the second distribution method is selected after the parallel join operations commence and is predicted to result in a lower aggregate cost of performing the parallel join operations as compared with continuing with the first distribution method; and
continuing the execution of the parallel join operations at least by communicating second distribution method instructions to at least some of the two or more execution units, and by apportioning at least some of the two relations among at least some of the two or more execution units according to the second distribution method.

9. The computer system of claim 8, wherein the two or more execution units are allocated for performing the parallel join operations from a plurality of execution units, and wherein the first distribution method instructions assign and distribute portions of the parallel join operations to the two or more execution units allocated for performing the parallel join operations from a plurality of execution units, the execution units operate on individual portions of the parallel join operations and return individual results of their portion of the parallel join operations.

10. The computer system of claim 8, wherein estimating the system cost comprises evaluating at least one of, a cardinality, a number of distinct values, a skew.

11. The computer system of claim 8, wherein collecting the at least some measurements pertaining to performing the first portion of the parallel join operations comprises a row count of at least one of the relations.

12. The computer system of claim 8, wherein the selection of the second distribution method further comprises selection of when to switch to the second distribution method, and wherein the selection of the second distribution method is based on at least meeting a threshold difference between the first system cost of switching to the second distribution method and the second system cost of continuing with the first distribution method.

13. The computer system of claim 8, the set of program code instructions further comprising program code for selecting a third distribution method.

14. The computer system of claim 8, in which the set of program code instructions further comprise program code to perform:
selecting a third distribution method, and
predicting, during the execution of the parallel join operations using the second distribution method, a third system cost of performing the parallel join operations with the third distribution method and a fourth system cost of continuing with the second distribution method based in part or in whole upon the at least some measurements, and
wherein estimating the system cost comprises evaluating at least one of, a cardinality, a number of distinct values, a skew, and the cardinality is an estimate of a number of rows to be produced by part of a query,
wherein the two or more execution units are allocated for performing the parallel join operations from a plurality of execution units, and wherein the first distribution method instructions assign and distribute portions of the parallel join operations to the two or more execution units allocated for performing the parallel join operations from a plurality of execution units, the execution units operate on individual portions of the parallel join operations and return individual results of their portion of the parallel join operations,
wherein the selection of the second distribution method further comprises selection of when to switch to the second distribution method, and wherein the selection of the second distribution method is based on at least meeting a threshold difference between the first system cost of switching to the second distribution method and the second system cost of continuing with the first distribution method,
wherein the broadcast-local distribution method comprises distributing an entire first table of the parallel join operations over a first relation of the two relations to each execution unit performing the parallel join operations and wherein a second relation of the two relations are read from a nonvolatile storage device, wherein the hash-hash distribution method comprises apportioning rows from the two relations of the parallel join operations to the two or more execution units where each apportioned row contains a particular value that is uniquely identified by a hash function, and wherein the broadcast-round-robin distribution method comprises distributing unordered sets of rows of the two relations to the two or more execution units.

15. A computer program product embodied in a non-transitory computer readable medium, the computer readable medium having stored thereon a sequence of instructions which, when executed by a processor causes the processor to execute a set of acts to implement adaptive selection of distribution methods responsive to measurements taken during execution of parallel join operations over two relations, the set of acts comprising:

estimating, during a compile phase, a system cost of performing parallel join operations over two relations;

selecting, during the compile phase, a first distribution method to perform the parallel join operations;

communicating first distribution method instructions to two or more execution units;

collecting, from at least one of the two or more execution units during execution of the parallel join operations, at least some measurements pertaining to performing a first portion of the parallel join operations, the first portion of the parallel join operations corresponding to the first distribution method that apportions the two relations among at least some of the two or more execution units;

predicting, during the execution of the parallel join operations using the first distribution method, a first system cost of performing the parallel join operations with a second distribution method and a second system cost of continuing with the first distribution method based in part or in whole upon the at least some measurements;

selecting the second distribution method based at least in part on the at least some measurements pertaining to performing the first portion of the parallel join operations, the second distribution method apportions the parallel join operations differently than the first distribution method, the first distribution method and the second distribution method comprising different distribution methods, the first distribution method and the second distribution method comprising at least two of a broadcast-local distribution method, hash-hash distribution method, or broadcast-round-robin distribution method, wherein the second distribution method is selected after the parallel join operations commence and is predicted to result in a lower aggregate cost of performing the parallel join operations as compared with continuing with the first distribution method; and continuing the execution of the parallel join operations at least by communicating second distribution method instructions to at least some of the two or more execution units, and by apportioning at least some of the two relations among at least some of the two or more execution units according to the second distribution method.

16. The computer program product of claim 15, wherein the two or more execution units are allocated for performing the parallel join operations from a plurality of execution units, and wherein the first distribution method instructions assign and distribute portions of the parallel join operations to the two or more execution units allocated for performing the parallel join operations from a plurality of execution units, the execution units operate on individual portions of the parallel join operations and return individual results of their portion of the parallel join operations.

17. The computer program product of claim 15, wherein estimating the system cost comprises evaluating at least one of, a cardinality, a number of distinct values, a skew.

18. The computer program product of claim 15, wherein collecting the at least some measurements pertaining to performing the first portion of the parallel join operations comprises a row count of at least one of the relations.

19. The computer program product of claim 15, wherein the selection of the second distribution method further comprises selection of when to switch to the second distribution method, and wherein the selection of the second distribution method is based on at least meeting a threshold difference between the first system cost of switching to the second distribution method and the second system cost of continuing with the first distribution method.

20. The computer program product of claim 15, the set of acts further comprising: selecting a third distribution method.

21. The computer program product of claim 15, the set of acts further comprising:

selecting a third distribution method, and predicting, during the execution of the parallel join operations using the second distribution method, a third system cost of performing the parallel join operations with the third distribution method and a fourth system cost of continuing with the second distribution method based in part or in whole upon the at least some measurements, and wherein estimating the system cost comprises evaluating at least one of, a cardinality, a number of distinct values, a skew, and the cardinality is an estimate of a number of rows to be produced by part of a query, wherein the two or more execution units are allocated for performing the parallel join operations from a plurality of execution units, and wherein the first distribution method instructions assign and distribute portions of the parallel join operations to the two or more execution units allocated for performing the parallel join operations from a plurality of execution units, the execution units operate on individual portions of the parallel join operations and return individual results of their portion of the parallel join operations, wherein the selection of the second distribution method further comprises selection of when to switch to the second distribution method, and wherein the selection of the second distribution method is based on at least meeting a threshold difference between the first system cost of switching to the second distribution method and the second system cost of continuing with the first distribution method, wherein the broadcast-local distribution method comprises distributing an entire first table of the parallel join operations over a first relation of the two relations to each execution unit performing the parallel join operations and wherein a second relation of the two relations are read from a nonvolatile storage device, wherein the hash-hash distribution method comprises apportioning rows from the two relations of the parallel join operations to the two or more execution units where each apportioned row contains a particular value that is uniquely identified by a hash function, and wherein the broadcast-round-robin distribution method comprises distributing unordered sets of rows of the two relations to the two or more execution units.

* * * * *

UNITED STATES PATENT AND TRADEMARK OFFICE
CERTIFICATE OF CORRECTION

PATENT NO.       : 10,019,481 B2                                    Page 1 of 1
APPLICATION NO.  : 13/839399
DATED            : July 10, 2018
INVENTOR(S)      : Jagtap et al.

It is certified that error appears in the above-identified patent and that said Letters Patent is hereby corrected as shown below:

In the Drawings

On sheet 3 of 7, in FIG. 3, Line 1, delete "AggregateLatency" and insert -- Aggregate Latency --, therefor.

In the Specification

In Column 1, Line 42, delete "T1 .x1 =T2.x2 )" and insert -- T1.x1=T2.x2) --, therefor.

In Column 10, Line 67, delete "PTSN," and insert -- PSTN, --, therefor.

Signed and Sealed this
Ninth Day of April, 2019

Andrei Iancu
*Director of the United States Patent and Trademark Office*